(12) United States Patent
Boydston et al.

(10) Patent No.: US 12,325,183 B2
(45) Date of Patent: Jun. 10, 2025

(54) ADDITIVE MANUFACTURING WITH CURABLE COMPOSITIONS

(71) Applicant: Wisconsin Alumni Research Foundation, Madison, WI (US)

(72) Inventors: Andrew Jackson Boydston, Middleton, WI (US); Chang-Uk Lee, Verona, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 326 days.

(21) Appl. No.: 18/161,987

(22) Filed: Jan. 31, 2023

(65) Prior Publication Data

US 2023/0182383 A1 Jun. 15, 2023

Related U.S. Application Data

(62) Division of application No. 16/909,491, filed on Jun. 23, 2020, now Pat. No. 11,597,145.

(60) Provisional application No. 62/866,044, filed on Jun. 25, 2019.

(51) Int. Cl.
| | |
|---|---|
| *B29C 64/165* | (2017.01) |
| *B33Y 10/00* | (2015.01) |
| *B33Y 30/00* | (2015.01) |
| *B33Y 40/20* | (2020.01) |
| *B33Y 70/10* | (2020.01) |
| *B29K 27/18* | (2006.01) |
| *B29K 105/00* | (2006.01) |
| *B29K 105/24* | (2006.01) |

(52) U.S. Cl.
CPC ............ *B29C 64/165* (2017.08); *B33Y 10/00* (2014.12); *B33Y 30/00* (2014.12); *B33Y 40/20* (2020.01); *B33Y 70/10* (2020.01); *B29K 2027/18* (2013.01); *B29K 2105/0002* (2013.01); *B29K 2105/246* (2013.01)

(58) Field of Classification Search
None
See application file for complete search history.

(56) References Cited

U.S. PATENT DOCUMENTS

2016/0288412 A1* 10/2016 Stampfl ................ B29C 64/124

FOREIGN PATENT DOCUMENTS

WO WO2000000335 * 1/2000 ............ B29C 35/08

* cited by examiner

*Primary Examiner* — Susan D Leong
*Assistant Examiner* — Tiffany Yu Huang
(74) *Attorney, Agent, or Firm* — Bell & Manning, LLC

(57) ABSTRACT

Methods for additive manufacturing are provided. In embodiments, such a method comprises illuminating a photothermal base with light, the photothermal base comprising a photothermal material and mounted in an additive manufacturing system to form a first interface between a surface of the photothermal base and a curable composition comprising thermally curable components, wherein the light induces light-to-energy conversion in the photothermal base to generate heat at the first interface, thereby inducing curing of the thermally curable components to form a first cured region. Additive manufacturing systems and photothermal bases are also provided.

20 Claims, 7 Drawing Sheets

(7) Blue-black Steel (0.1 mm)

ADDITIVE MANUFACTURING WITH CURABLE COMPOSITIONS

CROSS REFERENCE TO RELATED APPLICATIONS

The present application is a divisional of U.S. patent application Ser. No. 16/909,491 filed on Jun. 23, 2020, which claims the priority benefit of U.S. Provisional Patent application No. 62/866,044 that was filed Jun. 25, 2019, issued as patent Ser. No. 11/597,145 the entire contents of both of which are incorporated herein by reference.

BACKGROUND

Additive manufacturing (AM), also known as 3D printing, refers to a number of technologies for fabricating three-dimensional (3D) objects based on digital data representing the 3D objects. The digital data is broken down into a series of two-dimensional (2D) cross-sections and the 3D object is fabricated layer-by-layer. There are a number of 3D printing technologies for polymeric materials, which are based on the types of starting materials (i.e., powder, pellets, wires, and liquids). Stereolithography (SLA) is a type of 3D printing technique in which liquid photopolymer in a vat is selectively cured by light-activated polymerization. Although SLA achieves high geometric resolution, it requires starting materials that are photoactive, e.g., photocurable prepolymers or prepolymers doped with a photoactive or photothermal agent. As such, the resulting fabricated objects either have limited mechanical strength or are contaminated with the photoactive/photothermal agent.

SUMMARY

Provided are methods for additive manufacturing with curable compositions, including those comprising thermoset prepolymers. The additive manufacturing systems and related components are also provided.

In one aspect, methods for additive manufacturing are provided. In embodiments, such a method comprises illuminating a photothermal base with light, the photothermal base comprising a photothermal material and mounted in an additive manufacturing system to form a first interface between a surface of the photothermal base and a curable composition comprising thermally curable components, wherein the light induces light-to-energy conversion in the photothermal base to generate heat at the first interface, thereby inducing curing of the thermally curable components to form a first cured region.

In another aspect, additive manufacturing systems are provided. In embodiments, such a system comprises a source configured to provide a curable composition comprising thermally curable components; and a photothermal base comprising a photothermal material, the photothermal base mounted within the system to form an interface with the curable composition and to receive light from a light source, the photothermal base configured such that light-to-energy conversion induced upon illumination generates heat at the interface to induce curing of the thermally curable components.

In another aspect, photothermal bases for an additive manufacturing system are provided. In embodiments, such a photothermal base comprises a photothermal material, the photothermal base configured to be mounted within an additive manufacturing system to form an interface with a curable composition comprising thermally curable components and to receive light from a light source, the photothermal base further configured such that light-to-energy conversion induced upon illumination generates heat at the interface to induce curing of the thermally curable components.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are methods for additive manufacturing with curable compositions, including those comprising thermoset prepolymers. The additive manufacturing systems and related components are also provided.

The present methods and systems allow for the fabrication of 2D and 3D objects from curable compositions. The present methods and systems make use of light, but by contrast to stereolithographic methods, they do not require that the light illuminate the curable compositions to induce polymerization therein. Thus, the present methods and systems do not require that the curable compositions be photoactive (e.g., comprise a photothermal material or photocurable prepolymers). As such, the present methods and systems enable the advantage of high resolution to be realized with a much broader range of materials, including thermoset prepolymers and without contaminating such prepolymers.

In one aspect, methods for additive manufacturing are provided. The methods comprise illuminating a photothermal base comprising a photothermal material with light. The photothermal material absorbs the light to generate heat at a first interface formed between a surface of the photothermal base and a curable composition. In embodiments, the curable composition comprises thermoset prepolymers. The heat generated at the interface increases the temperature of the curable composition in a localized area therein which is sufficient to induce polymerization reactions between thermoset prepolymers (i.e., induce curing) to form thermoset polymer in the localized area. The cured, localized area may be referred to as a "cured region" of the curable composition. As described in more detail below, the light may be patterned to form a layer of a plurality of cured regions at the interface. Additional illumination steps can generate heat at new interfaces formed between the surface of the photothermal base and additional curable composition to form additional layers of cured regions. The collection of fabricated cured regions forms a cured object, e.g., a three-dimensional (3D) thermoset polymer object, the shape and dimensions of which can be controlled by the characteristics of the illumination (e.g., its pattern) and digital data corresponding to the desired object.

Figure 1:
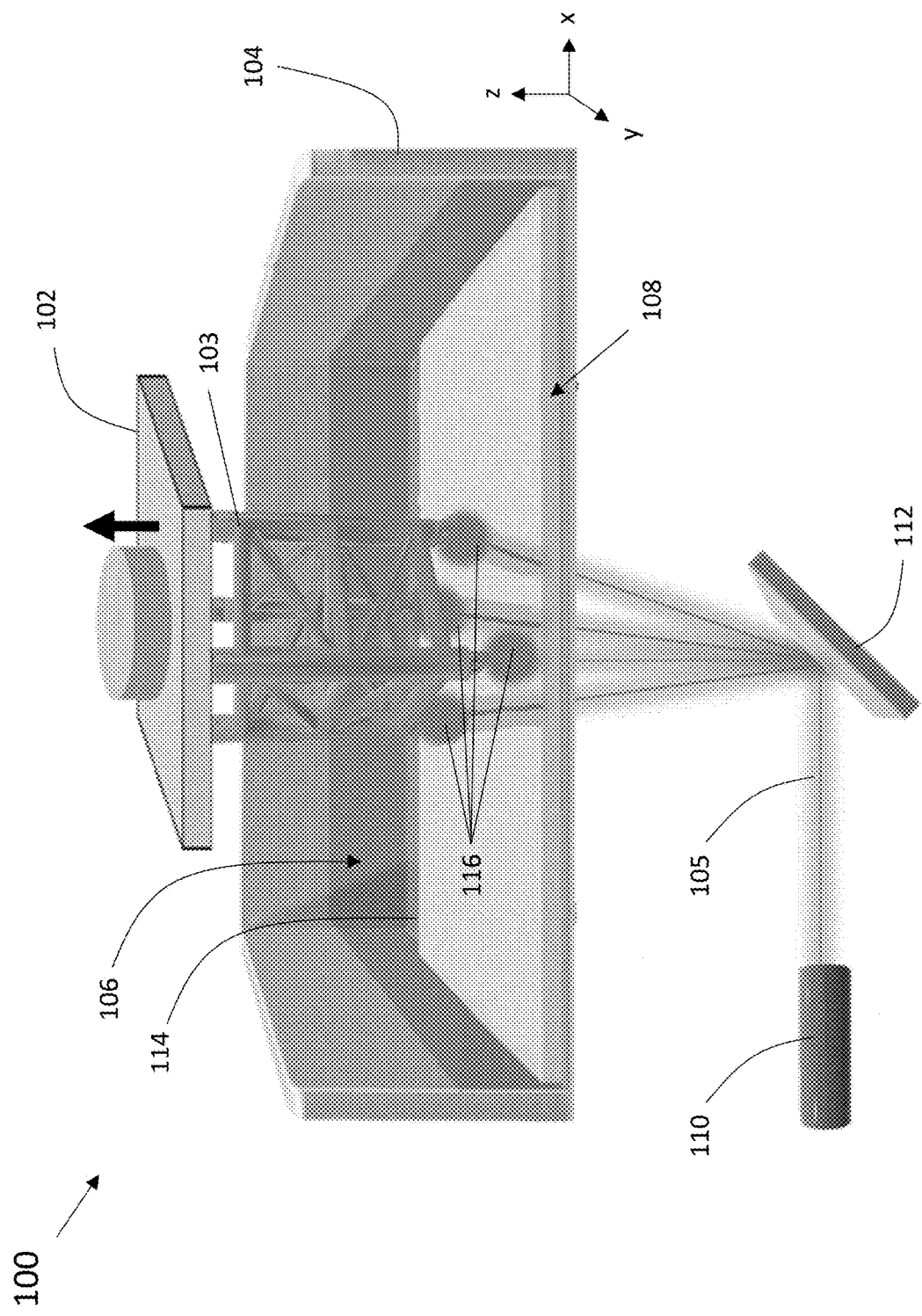
FIG. 1 is an illustrative embodiment of an additive manufacturing system.

The methods may be carried out using a variety of additive manufacturing systems, but an illustrative system 100 is shown in FIG. 1. The system 100 comprises a build plate 102 on which an object 103 is fabricated, a container (or vat) 104 configured to contain a curable composition 106, and a photothermal base 108 (in this illustrative embodiment, in the form of a plate). The photothermal base 108 comprises a photothermal material. The photothermal base 108 is mounted within the system 100 such that it can receive light 105 from a light source 110 (in this illustrative embodiment, a laser which may be scanned according to a pattern using a deflection mirror 112). The photothermal base 108 is mounted to the container 104 to form an interface 114 with the curable composition 106. Illumination of the photothermal base 108 on a surface opposite the interface 114 induces light-to-heat energy conversion due to the presence of the photothermal material. As noted above, the heat leads to a localized temperature increase at the interface 114 which induces curing of components (e.g., thermoset prepolymers) in the curable composition 106. The areas of localized heating and the resulting cured regions (both of which depend upon the pattern of the illumination) are indicated with reference 116.

The object 103 may be formed in a layer-by-layer fashion. That is, after forming a first layer of cured regions (i.e., the layer comprising the plurality of cured regions 116) using a first illumination step, the build plate 102 may be moved upwards. The first layer of cured regions (adhered directly or indirectly to the build plate 102) separates from the photothermal base 108 at the interface 114 and additional curable composition flows to form a new interface with the photothermal base 108 (as well as an interface with the previously formed first layer). The photothermal base 108 is again illuminated with light 105 to induce curing and form a second layer of cured regions. These steps may be repeated as desired.

Photothermal Base

The photothermal base to be used in the present methods comprises a photothermal material. The photothermal base is configured to mount within an additive manufacturing system (e.g., system 100) so as to form an interface with a curable composition provided by a source of the system (e.g., container 104) and to receive light from a light source (e.g., laser 110). The configuration of the photothermal base is also such that the light can induce light-to-energy conversion in the photothermal base to generate heat at the interface to induce curing as described above. Design parameters to achieve this include, e.g., the photothermal material (the composition of the photothermal material and its morphology/dimensions), the use of additional materials in the photothermal base, and the overall morphology/dimensions of the photothermal base. Selection of these parameters is generally guided by a desire to maximize photothermal efficiency, minimize the time to cure and the time to cool. Selection also involves considerations of the thermal conductivity and thermal stability of the photothermal base as well as its compatibility with the curable composition. Together these factors affect the curing efficiency and resolution of the fabricated object.

Regarding the photothermal material, they include those materials which exhibit a photothermal effect upon illumination with light, i.e., those which undergo non-radiative conversion of absorbed electromagnetic energy. Desirable photothermal materials are those for which the light-to-heat conversion is relatively efficient as compared to other possible energy transformation processes (e.g., photovoltaic energy conversion). An efficient light-to-heat conversion increases curing efficiency of the thermoset prepolymers. Illustrative photothermal materials include metals (e.g., gold, silver, platinum, copper, etc.), metal oxides (e.g., iron oxide), semiconductors (e.g., Si, Ge, etc.), carbon-based materials (e.g., carbon black, graphene, graphite, etc.), near-infrared organic dyes (e.g., Indocyanine Green, croconaine dye, etc.), other organic dyes (e.g., Sudan IV, chlorophyll, etc.), and optically active polymers (e.g., polyaniline, polypyrrole, etc.). At least some of these photothermal materials may be used in a nanostructured form (e.g., nanoparticles, nanotubes, nanorods, etc.), to enhance the photothermal effect due to surface plasmon resonance effects. The type of the photothermal material and the morphology and dimensions used can be adjusted to achieve a desired light-to-heat conversion (e.g., maximum) at a desired wavelength (or over a desired wavelength range). Combinations of different photothermal materials may be used in the photothermal base.

The photothermal materials may be combined with other materials to form the photothermal base. By way of illustration, the photothermal material(s) may be dispersed throughout another material forming a matrix to surround and embed the photothermal material(s) therein. As another example, the photothermal material(s) may be deposited onto another material forming a substrate to support a coating/film/layer of the photothermal materials(s) thereon. A variety of matrix/substrate materials may be used, including polymers, e.g., polydimethylsiloxane (PDMS), styrene-acrylonitrile, styrene-acrylics, polycarbonate, poly(methyl methacrylate) (PMMA), polytetrafluoroethylene (PTFE), etc. This includes thermoset polymers such as polyurethanes, epoxies, etc. Inorganic glasses, e.g., borosilicate, etc. may also be used.

Depending upon its composition, the photothermal base may be transparent to the light being used in the present methods or in embodiments, non-transparent. This means being transparent/non-transparent to a selected wavelength or range of wavelengths. In addition, the photothermal base can be non-transparent to a first selected wavelength/range of wavelengths and transparent to a second selected wavelength/range of wavelengths. As further described below, this is useful for methods in which the first wavelength/range of wavelengths is used to illuminate the photothermal base to induce light-to-heat energy conversion in the photothermal base (so that generated heat induces polymerization in the curable composition) and the second wavelength/range of wavelengths is used to illuminate the curable composition to induce polymerization. "Non-transparent" means light of a wavelength/range of wavelengths does not pass through the material to illuminate the curable composition and can refer to having a percent transmission at the wavelength/range of wavelengths of no more than 1%. "Transparent" means that light of a wavelength/range of wavelengths does pass through the material to illuminate the curable composition and can refer to having a percent transmission at the wavelength/range of wavelengths of at least 90%.

The photothermal material(s) may also be used by themselves to form the photothermal base. In such embodiments, the photothermal base may be considered to be composed of, to consist essentially of, or to consist of the photothermal material(s).

Photothermal bases having various overall shapes may be used. However, as shown in FIG. 1, the photothermal base may be planar in form and as such, may be referred to as a photothermal plate. An important dimension of the photothermal base is its thickness, which may be defined as the dimension of the photothermal base which is generally parallel with the light illuminating the photothermal base (e.g., see z in FIG. 1). The other two dimensions may be referred to as the lateral dimensions of the photothermal base (see x and y in FIG. 1). Generally, it is desirable to minimize the thickness. Small thicknesses increase curing efficiency as well as improve resolution by minimizing the effect of heat transfer along the lateral dimensions of the photothermal base. This keeps the lateral dimensions of the cured region close to the lateral dimensions of the illuminated area on the photothermal base. At the same time, the photothermal base is desirably sufficiently thick so as to adequately support the curable composition thereon. In embodiments, the thickness of the photothermal base is no greater than 3 mm, 2 mm, 1 mm, no greater than 0.75 mm, no greater than 0.50 mm, no greater than 0.25 mm, no greater than 0.10 mm, or in the range of from 150 μm to 3 mm.

Figure 4A:
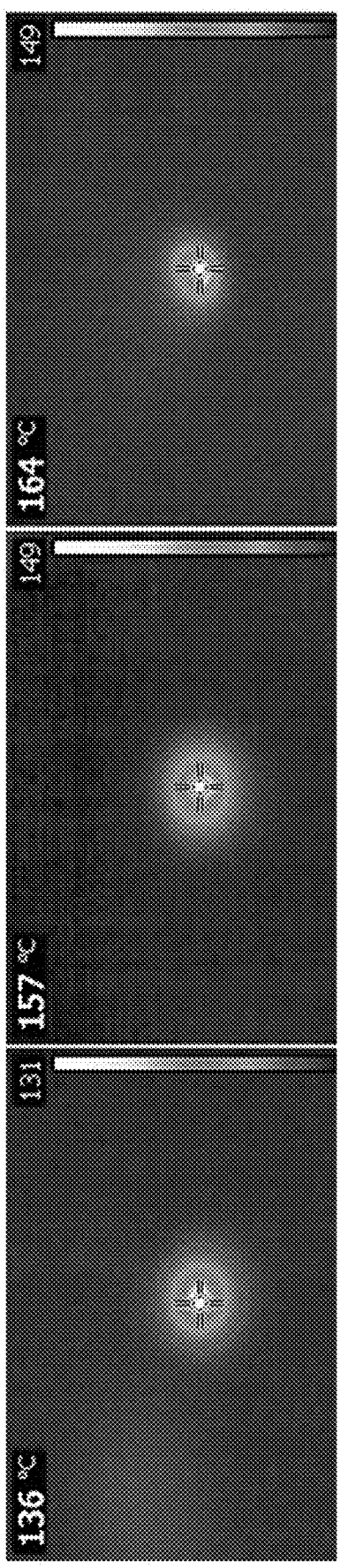
FIGS. 4A-4C are thermal images taken while using an additive manufacturing system similar to that of FIG. 1 to fabricate a thermoset polymer object.
Figure 4B:
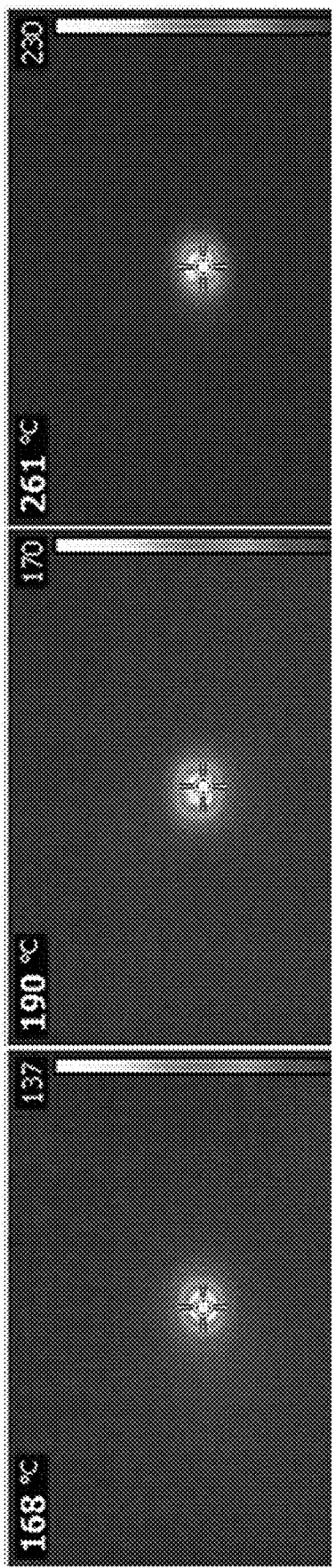
Figure 4C:
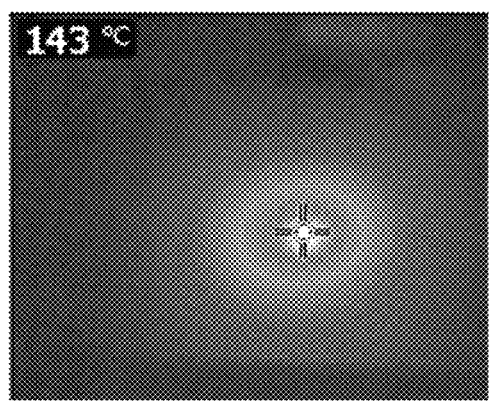

Regarding thermal conductivity, it is desirable for the photothermal base to have a thermal conductivity which minimizes the effect of heat transfer along its lateral dimensions. At the same time, efficient thermal conductivity is useful to increase curing efficiency. In addition, high thermal conductivity is useful for curable components having high curing temperatures. Thermal conductivity can be tuned via selection of the photothermal material(s) and/or additional materials(s) used to form the photothermal base. In embodiments, the photothermal base exhibits a thermal conductivity of no more than 1 W/mK, no more than 0.50 W/mK, no more than 0.25 W/mK, or no more than 0.15 W/mK. In embodiments, the photothermal base exhibits a thermal conductivity in a range of 0.1 to 60 W/mK. The effect of thermal conductivity is illustrated in FIGS. 4A-4C, showing that illumination of a 0.1 mm thick photothermal base composed of black-blue steel results in a much larger heated area as compared to a 0.1 mm thick photothermal base composed of black Teflon. Black-blue steel has a thermal conductivity of 50 W/mK, whereas black Teflon has a thermal conductivity of 0.25 W/mK.

At the same time, the photothermal base is desirably sufficiently thermally stable to withstand the increased temperatures generated by the light-to-heat conversion. These increased temperatures are generally at least as high as the curing temperature of curable components in the curable composition, e.g., at least 50° C., at least 75° C., at least 100° C., at least 125° C., at least 135° C., at least 145° C., at least 150° C., at least 175° C., etc. Again, thermal stability can be tuned via selection of the photothermal material(s) and/or additional material(s) used to form the photothermal base. In embodiments, the photothermal base exhibits a heat deflection temperature, a melting temperature, or a decomposition temperature greater than the curing temperature of curable components in the curable composition and, e.g., at least any of the temperatures described above.

Another consideration is the compatibility of the photothermal base with the curable composition/thermoset polymer. Chemical inertness between the materials is desirable. Also, it is desirable to minimize adhesion of the cured region (e.g., thermoset polymer) and the photothermal base so as to facilitate separation of the two at their interface. Again, this can be achieved via selection of the photothermal material(s) and/or additional materials(s) used to form the photothermal base. Adhesion can be quantified by reference to the relative surface energies of the photothermal base and another surface on which the cured regions may be adhered (e.g., build plate 102 of FIG. 1). It is desirable that the cured regions have a greater adhesion to the other surface (e.g., build plate) than to the photothermal base.

Figure 2:
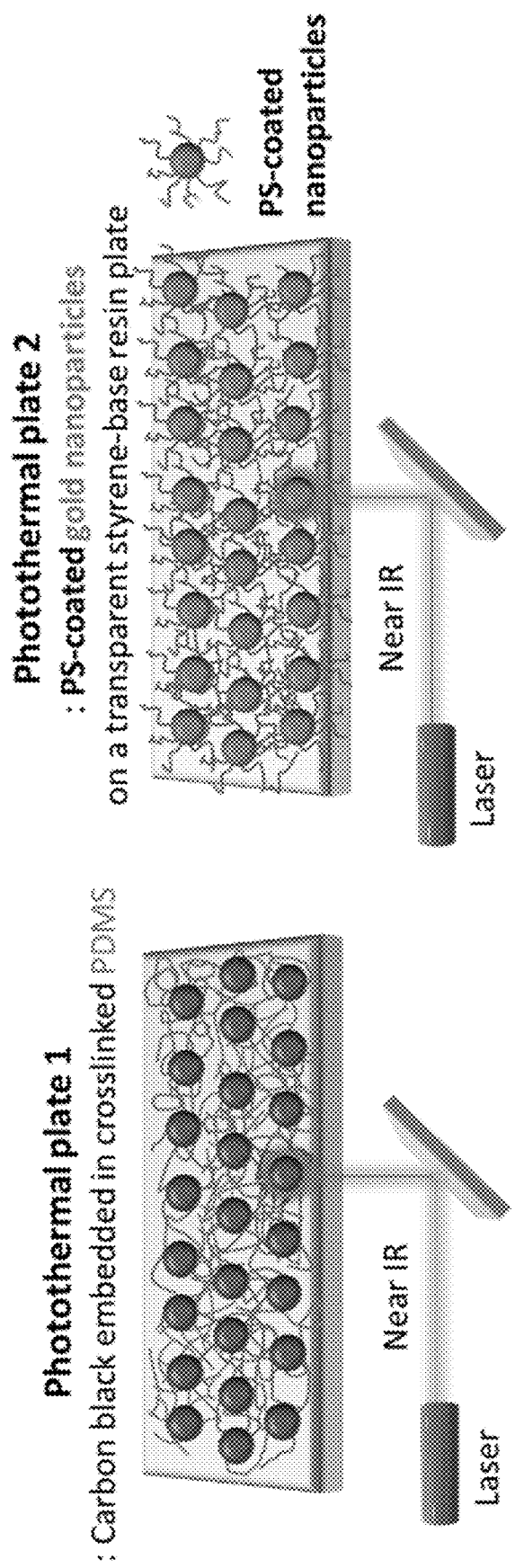
FIG. 2 show illustrative embodiments of photothermal bases for use with the disclosed additive manufacturing systems.

Illustrative photothermal bases are shown in FIG. 2 and others are described in the Examples, below.

Light

The light used in the present methods may be characterized by its wavelength and its intensity. The wavelength may be selected to achieve a desired light-to-heat conversion (e.g., maximum) for a desired photothermal material/photothermal base. Suitable light, particularly for some of the photothermal materials described above, is light having a wavelength (or range of wavelengths) in the near-infrared region of the electromagnetic spectrum, e.g., from 700 nm to 1200 nm. However, other wavelengths may be used. The intensity may be selected to achieve a desired curing efficiency. The light may be focused or otherwise shaped to achieve a desired illumination area on the photothermal base. As described above, this controls, at least in part, the size of the heated region/cured region. The duration of light illumination may also be adjusted to ensure curing while maintaining a desired resolution. Illustrative wavelengths, intensities and durations are described in the Examples below.

The source of the light is not particularly limited. Laser light is useful as such light can be intense and tightly focused (providing small illuminated areas and thus, high resolution). As noted above, the light may be (although it need not be) patterned. Patterned illumination maybe achieved by moving a single light beam (e.g., a laser) according to a predetermined pattern (i.e., scanning) across the surface of the photothermal base. Patterned illumination may also be achieved by using a digital micromirror device (DMD) as the light source. Whether the illumination is sequential (scanning) or simultaneous (digital light processing, DLP), the illumination step of the present methods creates a corresponding pattern of heated regions at the interlace between the photothermal base and the curable composition and thus, a corresponding pattern of cured regions.

Since the light used in the present methods does not have to illuminate the curable compositions and since those compositions do not have to comprise any photoactive or photocurable components, the light used for the illumination need not be selected with reference to the components of the curable compositions. However, as further described below, the curable compositions could contain such photoactive or photocurable components, e.g., in addition to thermoset prepolymers (which are not photoactive/photocurable). In such embodiments, at least some steps of the present methods may use light having a wavelength/intensity selected to induce photoactivity in the curable composition, e.g., radical induced polymerization of photocurable prepolymers to form a photopolymer.

Curable Composition

The curable composition used in the present methods comprises one or more curable components. The curable components are generally (but need not exclusively be) thermally curable components such as thermoset prepolymers. In such embodiments, the thermoset prepolymer and additional components of the curable composition depend upon the desired thermoset polymer. Generally, thermoset prepolymers include monomers and/or oligomers which are polymerized through chemical reactions induced by heat as part of the curing process. Thus, as used herein, "prepolymer" refers to the repeating units of a polymer and includes monomers and oligomers which may make up a polymer. The term "prepolymer" may also refer to polymer chains which become crosslinked through chemical reactions. The additional components may include any solvents, catalysts, and/or curing agents (additives useful to facilitate curing and formation of the desired thermoset polymer). The curable composition may include different types of thermoset prepolymers to form different thermoset polymers.

The types of thermoset prepolymers are not particularly limited. Illustrative thermoset prepolymers include those which form the following thermoset polymers upon curing: polyurethanes, epoxides, silicones (e.g., PDMS). Thermoset prepolymers comprising certain functional groups, e.g., isocyanates, silanes, cyanate esters, trifluorovinylether, phenylethynyl, and polyamic acid may be used. Additionally, inorganic materials, including metal oxides, can be used in liquid form.

As noted above, the curable composition may include photocurable components, including photocurable prepolymers. Generally, photocurable prepolymers include monomers and/or oligomers which are polymerized through free radical polymerization reactions included by light as part of the curing process. By way of illustration only, a curable composition may comprise thermoset prepolymers and photocurable prepolymers (solvents, catalysts, photoinitiators, and/or curing agents may also be included). As noted above, illumination step(s) may use light having one wavelength (or range) which is optimized for thermal curing to provide the thermoset polymer (e.g., 808 nm) and light having another wavelength (or range) which is optimized for photocuring to provide the photopolymer (e.g., 405 nm).

The curable composition may also include a functional additive which is added to adjust the properties (e.g., mechanical strength, chemical reactivity, etc.) of the fabricated object. Such functional additives may include particles or nanoparticles (of various compositions). Examples include biocidal glass particles, metal oxide particles, silica particles, gold nanoparticles.

In embodiments, the curable composition does not comprise a photoactive component, e.g., a photothermal material such as any of the photothermal materials described above. In embodiments, the curable composition does not comprise a photocurable prepolymer. In embodiments, the curable composition is composed of consists essentially of, or consists of thermoset prepolymers and optionally, one or more of a solvent(s), a catalyst(s), a curing agent(s), and a functional additive(s).

Figure 5B:
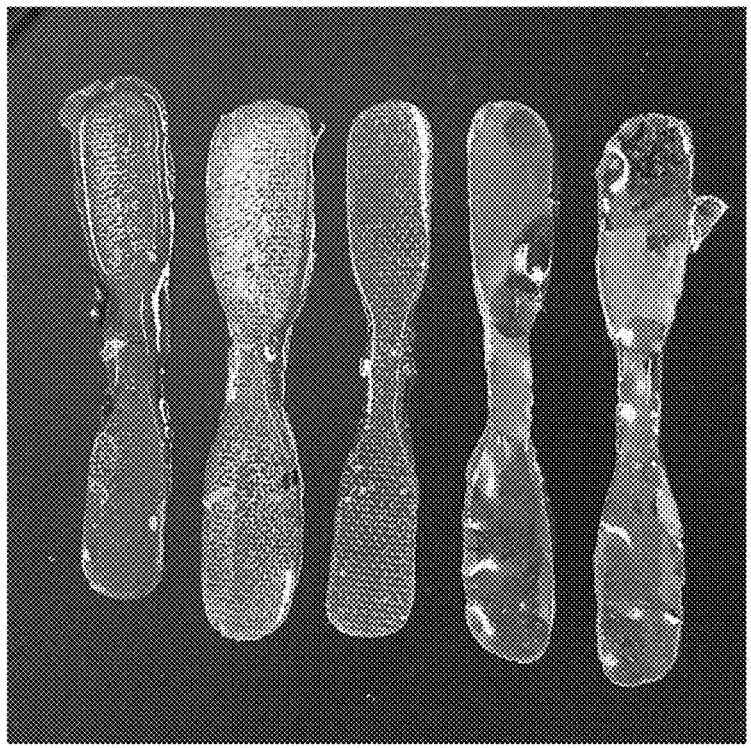
FIG. 5B shows the resulting thermoset polymer objects.
Figure 5A:
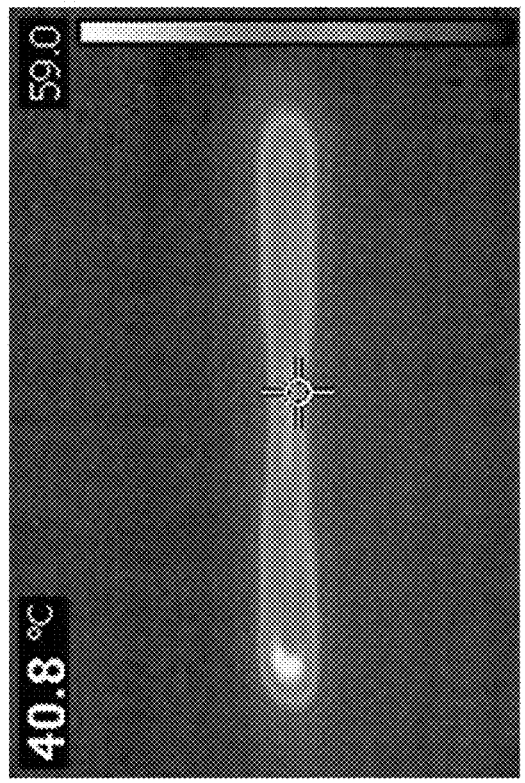
FIG. 5A is a thermal image taken while using an additive manufacturing system similar to that of FIG. 1 to fabricate a thermoset polymer object.

With reference back to the system 100 of FIG. 1, a first illumination step provides a layer of a plurality of cured regions 116, wherein the shape, dimensions and relative position of each cured region within the layer depends upon the illumination characteristics. This layer is effectively a 2D object and additional illumination steps may be used to fabricate additional layers of cured regions and thus, a 3D object. As further described in the Examples, below, a system similar to system 100 of FIG. 1 was used to form several 2D layers of PDMS, each having a dog-bone shape. FIG. 5A shows a thermal image taken during the process in which laser light was scanned laterally (in x and y dimensions) on a surface of a black Teflon photothermal plate in a dog-bone pattern. The corresponding dog-bone shaped layers of PDMS are shown in FIG. 5B. As described above, the composition, shape, dimensions, resolution, and properties of the 2D and 3D fabricated objects are controllable by the curable composition and the illumination step(s).

Objects fabricated by the present methods need not be (although they can be) subjected to any additional curing steps. In embodiments, the object fabricated by the present methods is fully cured, e.g., greater than 95% of the material of the object has been converted into an insoluble, intractable, solid form. In other words, the object's gel fraction is greater than 95%. In other embodiments, the object fabricated by the present methods is partially cured and may be subjected to a post-curing step, e.g., heating in an oven. In such embodiments, the partially cured object may have fixity, meaning the curing has been sufficient to allow the partially cure object to freely stand under its own weight without deforming.

It is noted that system 100 is merely illustrative and additive manufacturing systems for carrying out the present methods may include additional, fewer, and/or different components as compared to those shown in FIG. 1.

Regarding additional components of suitable additive manufacturing systems, including system 100, other optical, mechanical, and/or electrical assemblies/devices may be used. In addition, suitable additive manufacturing systems, including system 100, may include a controller configured to control one or more components of the system. The controller may be integrated into the system as part of a single device or its functionality may be distributed across one or more devices that are connected to other system components directly or through a network that may be wired or wireless. A database, a data repository for the system, may also be included and operably coupled to the controller.

Figure 3:
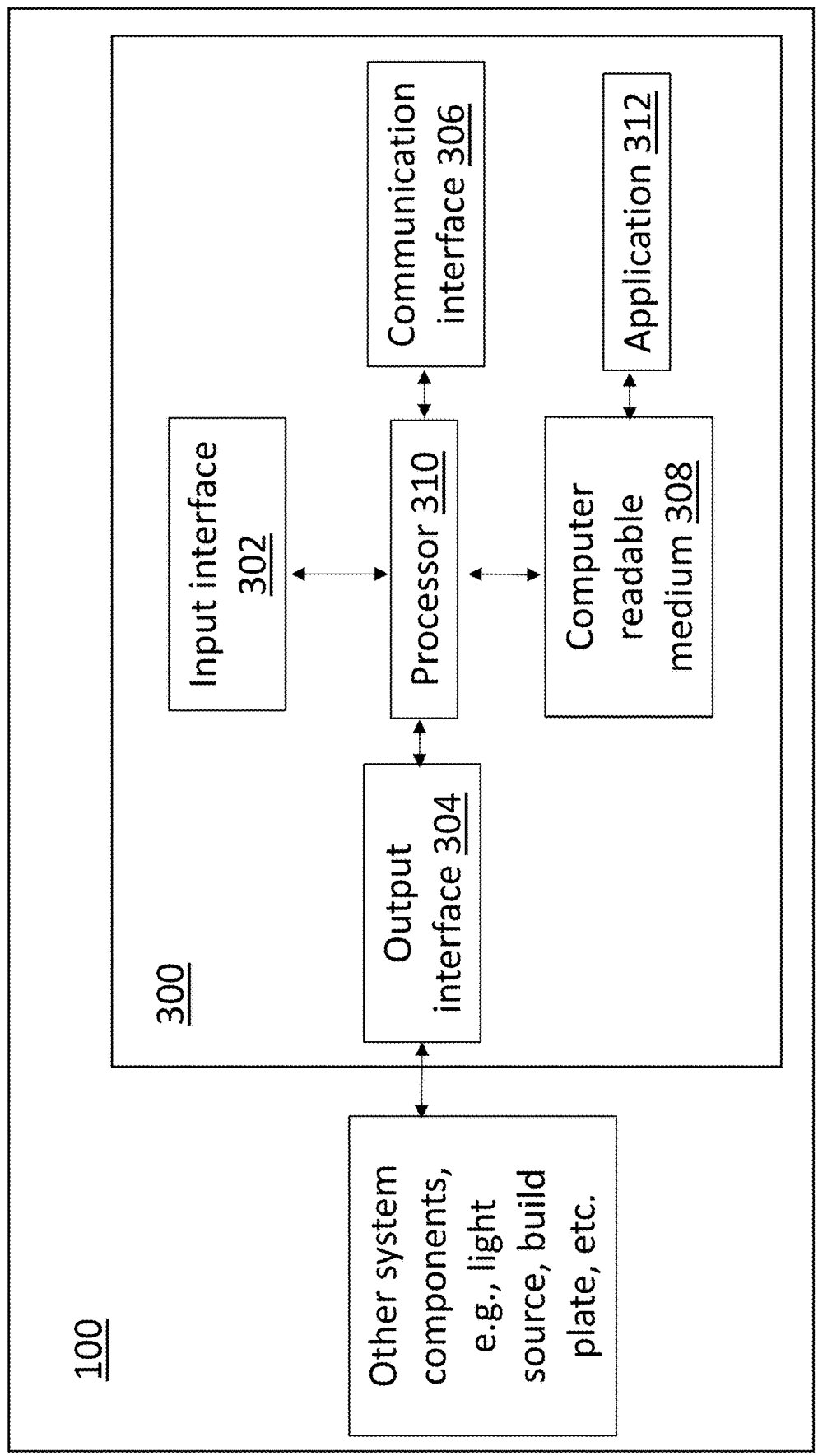
FIG. 3 is a block diagram of additional components of the additive manufacturing system of FIG. 1.

As shown in the illustrative embodiment of FIG. 3, a controller 300 which may be included in a suitable additive manufacturing system, including system 100, may include an input interface 302, an output interface 304, a communication interface 306, a computer-readable medium 308, a processor 310, and an application 312. The controller 300 may be a computer of any form factor including an electrical circuit board.

The input interface 302 provides an interface for receiving information into the controller 300. Input interface 302 may interface with various input technologies including, e.g., a keyboard, a display, a mouse, a keypad, etc. to allow a user to enter information into the controller 300 or to make selections presented in a user interface displayed on the display. Input interface 302 further may provide the electrical connections that provide connectivity between the controller 300 and other components of the system 100.

The output interface 304 provides an interface for outputting information from the controller 300. For example, output interface 304 may interface with various output technologies including, e.g., the display or a printer for outputting information for review by the user. Output interface 304 may further provide an interface for outputting information to other components 314 of the system 100.

The communication interface 306 provides an interface for receiving and transmitting data between devices using various protocols, transmission technologies, and media. Communication interface 306 may support communication using various transmission media that may be wired or wireless. Data and messages may be transferred between the controller 300, the database, other components of the system 100 and/or other external devices using communication interface 306.

The computer-readable medium 308 is an electronic holding place or storage for information so that the information can be accessed by the processor 310 of the controller 300. Computer-readable medium 308 can include any type of random access memory (RAM), any type of read only memory (ROM), any type of flash memory, etc. such as magnetic storage devices, optical disks, smart cards, flash memory devices, etc.

The processor 310 executes instructions. The instructions may be carried out by a special purpose computer, logic circuits, or hardware circuits. Thus, the processor 310 may be implemented in hardware, firmware, or any combination of these methods and/or in combination with software. The term "execution" is the process of running an application 312 or the carrying out of the operation called for by an instruction. The instructions may be written using one or more programming language, scripting language, assembly language, etc. Processor 310 executes an instruction, meaning that it performs/controls the operations called for by that instruction. Processor 310 operably couples with the input interface 302, with the output interface 304, with the computer-readable medium 308, and with the communication interface 306 to receive, to send, and to process information. Processor 310 may retrieve a set of instructions from a permanent memory device and copy the instructions in an executable form to a temporary memory device that is generally some form of RAM.

The application 312 performs operations associated with controlling other components of the system 100. Some of these operations may include receiving and/or processing digital data to be used during fabrication of the object. The digital data includes information relating to the desired shape and dimensions of the object. Other of these operations may include controlling components of the system 100 based on the digital data. Some or all of the operations described in the present disclosure may be controlled by instructions embodied in the application 312. The operations may be implemented using hardware, firmware, software, or any combination of these methods. With reference to the illustrative embodiment of FIG. 3, the application 312 is implemented in software (comprised of computer-readable and/or computer-executable instructions) stored in the computer-readable medium 308 and accessible by the processer for execution of the instructions that embody the operations of application 312. The application 312 may be written using one or more programming languages, assembly languages, scripting languages, etc.

It is noted that devices including the processor 310, the computer-readable medium 308 operably coupled to the processor 310, the computer-readable medium 308 having computer-readable instructions stored thereon that, when executed by the processor 310, cause the device to perform any of the operations described above (or various combinations thereof) are encompassed by the disclosure. The computer-readable medium 308 is similarly encompassed.

As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element). The elements may be mounted permanently, removably, or releasable unless specified otherwise.

EXAMPLES

Photothermal Bases

Different photothermal bases were evaluated for use in additive manufacturing of thermoset prepolymers. Seven different photothermal bases were used to investigate (1) temperature profiles upon illumination with light, (2) time to cure at different light intensities, (3) size of localized heating area, and (4) time to cool down after curing. The first two factors affect curing efficiency while the third and fourth factors affect resolution of the cured object.

The curable composition was Sylgard 184, which contains monomer and curing agent to form PDMS (a thermoset polymer). The light source was a diode laser (beam size: 4 mm×6 mm) haying a wavelength of 808 nm. Various intensities were used as listed in Table 1, below. The photothermal bases were planar in form having various thicknesses and composed of different materials as listed in Table 1, below. Crosslinked PDMS with carbon black (entry 3) was prepared by mixing Sylgard 184 with carbon black (1 wt %) and thermally curing. All other photothermal bases were made from commercially available materials. To test the photothermal bases, an amount of Sylgard 184 was deposited on the surface of the photothermal base and the opposite surface was illuminated with light. The temperature of the Sylgard 184 during curing (light on) and after curing (light off) was determined by an infrared camera (IR). This also enabled determination of the time to cure and the time to cool down after curing. Time to cure is also equivalent to the duration of illumination.

TABLE 1

Results of curing PDMS prepolymers using photothermal bases.

| Entry | Photothermal base | Power of laser (W) | Time to Cure (sec.) | Maximum temp.[1] (° C.) | Cured? | Time to reach <40° C. after curing (sec.) | Notes |
|---|---|---|---|---|---|---|---|
| 1 | Black polycarbonate plate (thickness: 1.5 mm) | 4 | <5 | >120 | Yes | 60~70 | Smooth surface: easy to peel off cured object |
| | | 3 | <5 | >120 | Yes | | |
| | | 2 | 20~30 | >120 | Yes | | |
| | | 1 | 60 | 50 | No | | Plate melts at 3-4 W |
| 2 | Black plexiglass (PMMA) plate (thickness: 1.5 mm) | 4 | <5 | >120 | Yes | 60~70 | Smooth surface: easy to peel off cured object |
| | | 3 | 10~15 | >120 | Yes | | |
| | | 2 | 20~25 | >120 | Yes | | |
| | | 1 | 60 | 50 | No | | Plate melts at 3-4 W Thermally weaker than entry 1 |
| 3 | Crosslinked PDMS with carbon black (1 | 4 | <5 | >120 | Yes | 60~70 | Cured objects stick |
| | | 3 | <5 | >120 | Yes | | |
| | | 2 | 15~20 | >120 | Yes | | |

TABLE 1-continued

Results of curing PDMS prepolymers using photothermal bases.

| Entry | Photothermal base | Power of laser (W) | Time to Cure (sec.) | Maximum temp.[1] (° C.) | Cured? | Time to reach <40° C. after curing (sec.) | Notes |
|---|---|---|---|---|---|---|---|
|  | wt %) (thickness: 1 mm) | 1 | 60 | 60 | No |  |  |
| 4 | Black Teflon (PTFE) sheet (thickness: 0.75 mm) | 4 | <5 | >120 | Yes | 50~60 | Thermally strongest |
|  |  | 3 | 5 | >120 | Yes |  | Fast, efficient curing |
|  |  | 2 | 10 | >120 | Yes |  | Easiest to peel off cured object |
|  |  | 1 | 60 | 70 | No |  |  |
| 5 | Black Teflon (PTFE) cooking sheet (thickness: 0.2 mm) | 4 | <3 | >150 | Yes | 30~40 | Thermally strongest |
|  |  | 3 | <3 | >150 | Yes |  | Fast, efficient curing |
|  |  | 2 | <5 | >120 | Yes |  | Easiest to peel off cured object |
|  |  | 1.5 | 5~10 | >120 | Yes |  |  |
|  |  | 1 | 60 | 100 | Partially yes |  |  |
| 6 | Black PTFE A4 thin sheet (thickness: 0.1 mm) | 4 | <3 | >150 | Yes | 15~20 | Thermally strongest |
|  |  | 3 | <3 | >150 | Yes |  | Fast, efficient curing |
|  |  | 2 | 5 | >120 | Yes |  | Easiest to peel off cured object |
|  |  | 1 | 60 | 60 | No |  |  |
| 7 | Blue-black steel plate (thickness: 0.1 mm) | 4 | 5 | >120 | Yes | 10 | Largest heating area |
|  |  | 3 | 15~20 | >120 | Yes |  |  |
|  |  | 2 | 60 | 80 | No |  |  |

[1]The maximum temperature recorded at the recorded time to cure and power used. E.g., for entry 1, the maximum temperature was 120° C. after 5 seconds using a power of 5 W.

The results show that the black PTFE sheets (entries 4, 5, 6) performed exceptionally well in terms of photothermal efficiency, localized heating, separation of cured objects from the surface of the photothermal base, and short times to reach room temperature after curing. Moreover, the thermoset prepolymer could be cured even at 2 W of light using these photothermal plates. Temperature profiles showed that temperatures of about 300° C. could be achieved in a few seconds, which is sufficient to thermally cure many thermoset prepolymers. FIGS. 4A-4C show thermal images of the curing process. The thin black PTFE sheets (FIG. 4B) showed most localized areas of heating. Despite close thermal conductivities of the polycarbonate and plexiglass to PTFE, the larger heating areas for these photothermal bases (FIG. 4A) are due to their increased thickness. The steel showed the largest heating area (FIG. 4C). Thermal conductivities (W/mK) of the materials are as follows: polycarbonate and Plexiglass (~0.2), PDMS (~0.15), PTFE (~0.25), and steel (~50). This shows that metal plates coated with black paints may be less desirable (if resolution is important). Similarly, a stainless-steel plate coated with PDMS/carbon black also showed a relatively large heating area. The use of multi-layered photothermal bases can increase heating area.

Fabrication of a PDMS Object

An additive manufacturing system similar to system 100 of FIG. 1 was used. The photothermal base was either a 0.2 mm thick black PTFE plate or a 0.75 mm thick black PTFE plate. The laser was mounted onto a direct ink writing (DIW) printer in place of the syringe. Sylgard 184 was deposited on a surface of the photothermal base and the opposing surface illuminated with the laser. The laser was moved using a raster pattern programmed by G-code. The pattern formed a dog-bone shape (ASTM D638 type V). FIG. 5A shows a thermal image taken during illumination/curing. FIG. 5B shows several cured PDMS objects having a corresponding dog-bone shape.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An additive manufacturing system comprising:
    a source configured to provide a curable composition comprising thermally curable components; and
    a photothermal base comprising a photothermal material, the photothermal base mounted within the system to form a first interface between a surface of the photothermal base and the curable composition and to receive light from a light source, the photothermal base configured such that light-to-energy conversion induced in the photothermal base upon illumination with the light generates heat at the first interface to induce curing of the thermally curable components, wherein the photothermal base is positioned in the additive manufacturing system so that it is between the curable composition and the light.

2. The system of claim 1, further comprising the curable composition.

3. The system of claim 2, wherein the thermally curable components comprise thermoset prepolymers.

4. The system of claim 2, wherein the curable composition is free of a photocurable prepolymer.

5. The system of claim 4, wherein the curable composition is free of any photothermal material.

6. The system of claim 1, wherein the photothermal material is selected from metals, metal oxides, semiconductors, carbon-based materials, organic dyes, optically active polymers, and combinations thereof.

7. The system of claim 1, wherein the photothermal base comprises a polymer or an inorganic glass and the photothermal material is in contact with the polymer or the inorganic glass.

8. The system of claim 7, wherein the photothermal material is selected from metals, metal oxides, semiconductors, carbon-based materials, organic dyes, optically active polymers, and combinations thereof.

9. The system of claim 1, wherein the photothermal base comprises a polymer matrix and the photothermal material is dispersed throughout the polymer matrix.

10. The system of claim 9, wherein the polymer matrix is polytetrafluoroethylene and the photothermal material is carbon black.

11. The system of claim 1, wherein the photothermal base is characterized by one or more of: a planar morphology having thickness of not more than 3 mm; a thermal conductivity in a range of from 0.1 W/mK to 1 W/mK; and a heat deflection temperature, a melting temperature, or a decomposition temperature of at least as high as a curing temperature of the curable composition.

12. The system of claim 1, wherein the photothermal base is non-transparent to the light such that the light does not illuminate the curable composition.

13. The system of claim 1, wherein the photothermal base is non-transparent to light of a first range of wavelengths such that the light of the first range of wavelengths does not illuminate the curable composition and the photothermal base is transparent to light of a second range of wavelengths.

14. The system of claim 1, wherein the source is a container and the photothermal base is mounted to the container.

15. The system of claim 1, further comprising the light source.

16. The system of claim 1, further comprising a controller comprising a processor, and a non-transitory computer-readable medium operably coupled to the processor, the non-transitory computer-readable medium comprising instructions that, when executed perform operations comprising illuminating the photothermal base with the light.

17. An additive manufacturing system comprising:
a source configured to provide a curable composition comprising thermally curable components; and
a photothermal base comprising a photothermal material, the photothermal base mounted within the system to form a first interface between a surface of the photothermal base and the curable composition and to receive light from a light source, the photothermal base configured such that light-to-energy conversion induced in the photothermal base upon illumination with the light generates heat at the first interface to induce curing of the thermally curable components, wherein the photothermal base is non-transparent to the light such that the light does not illuminate the curable composition.

18. The system of claim 17, further comprising the curable composition.

19. The system of claim 18, wherein the curable composition is free of a photocurable prepolymer.

20. The system of claim 19, wherein the curable composition is free of any photothermal material.

* * * * *